Aug. 19, 1958     ISAMU U. YEDA     2,847,816
FLEXIBLE HAND RAKE
Filed May 10, 1954
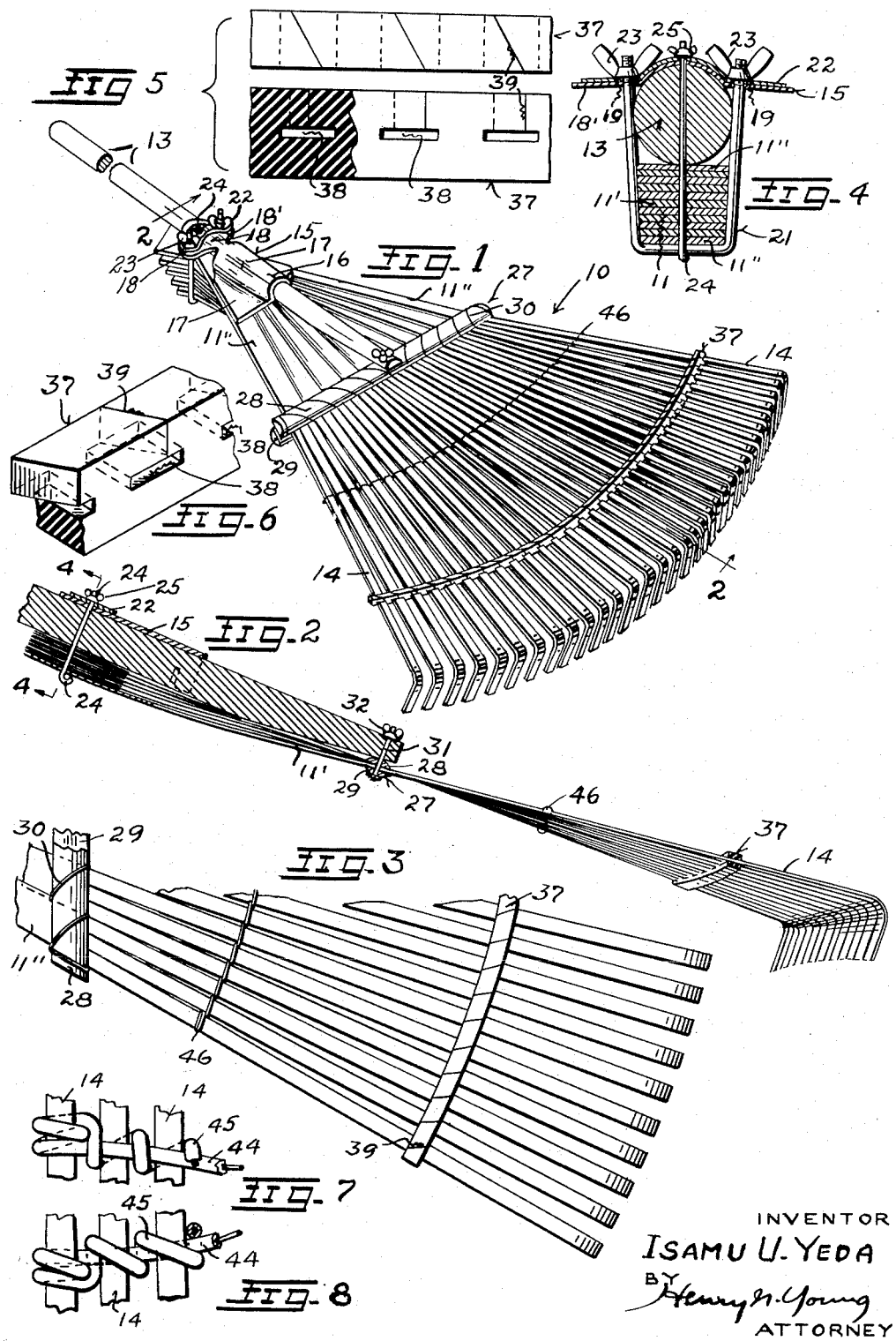
INVENTOR
ISAMU U. YEDA
BY
Henry N. Young
ATTORNEY

United States Patent Office 2,847,816
Patented Aug. 19, 1958

2,847,816
FLEXIBLE HAND RAKE
Isamu U. Yeda, Alameda, Calif.

Application May 10, 1954, Serial No. 428,735

4 Claims. (Cl. 56—400.17)

This invention relates to flexible sweeping or raking implements, and more particularly to a flexible hand rake comprising an elongated handle carrying a fan-shaped head structure of flexible tines at an end thereof.

Rakes of the character indicated have tines provided by fingers comprising flat strips of resilient material, such as bamboo or steel, with the strips mutually superimposed and joined together at one end of the head structure provided by the strips and diverging from such one end to the other end to provide a generally sector-shaped fan-shaped head structure. The handle is joined at one end to the superimposed ends of the strips by a suitable clamping connection and the strips extend from the handle end to provide a flexible head. Between the ends of the rake head structure the flexible tines are usually cross-connected by one or more fastener bands extending across the head to maintain their orderly spacing and transversely increase the stiffness of the structure thereat. In previous such rakes, a bending or breaking of tines has chiefly occured at the forward tie band, or some of the fingers have become released from the band and so fail to fully cooperate with the other tines in sweeping or raking actions. It has also been found difficult in previous rake structures of this character to maintain a handle stick firmly, yet releasably, attached to the tine assembly, and to maintain the tines in proper position relative to the handle and each other.

It is therefore among the objects of the present invention to provide an implement, such as a leaf rake, having an improved means for securing tine-providing strips together in mutually superposed relationship at one end of the head structure, improved means for attaching the handle stick of the rake to the head in a manner such that the tine strips are detachably secured together and are detachably connected to the handle so that any tine which has been bent or broken can be easily removed and replaced by a new one, and flexible cross-bands spaced along the tine strips from the handle and securing the strips together in divergent relationship to each other in a manner such that they will not be accidentally released from the flexible fastening bands and the danger of the strips or tines being bent or broken adjacent the bands is greatly reduced. It is also an object to provide a rake of the character indicated which is easy to assemble and can be produced at a minimum cost.

The invention possesses other objects and features of advantage, some of which, with the foregoing, will be set forth or be apparent in the following description thereof, and in the accompanying drawings, in which, Figure 1 is a top perspective view of a sweeping rake embodying my present features of invention.

Figure 2 is a longitudinal cross-sectional view taken on the line 2—2 of Figure 1.

Figure 3 is a fragmentary top plan view of the rake.

Figure 4 is an enlarged transverse cross-sectional view on the line 4—4 of Figure 2.

Figure 5 is an enlarged combined top plan and side elevational view of a portion of a tine-tieing band of the assembly.

Figure 6 is a fragmentary perspective view of the tie band shown in Figure 5.

Figure 7 is an enlarged fragmentary top plan view of the rake provided with a modified form of tie band for the tines.

Figure 8 is an underneath fragmentary view of the tie band installation of Figure 7.

As particularly illustrated, the numeral 10 generally indicates a symmetrical and substantially fan-shaped rake head structure comprising an odd number of flat finger strips 11 formed of resilient material, such as steel or bamboo, and of substantially equal length, secured in superposed relationship at the apical end portion of the strip assembly to a handle 13 comprising a stick extending rearwardly therefrom. Each strip 11 is longitudinally split or divided from a location intermediate its length to the end thereof remote from the apical end of the head assembly to provide three resilient tines 14 of substantially equal width. A clamp structure, including a one-piece plate member 15 mutually secures the ends of the strips 11 to the handle 13 in a mutually crossed superposed relation in which the central strip 11' is furthest from the opposed handle end portion. The strips 11 diverge from the superposed end portions thereof uniformly and symmetrically of the width of the structure 10, and the tines 14 diverge uniformly from their proximal to their distal ends at which they are transversely bent in a like direction to provide terminal rake teeth thereat extending at the under side of the head in an arcuate line.

The clamp member 15 comprises a generally rigid symmetrical structure which may be conveniently shaped of sheet material to provide a relatively short forward handle-receiving split sleeve portion 16, and an intermediate handle-receiving channel portion 17 having its open side oposite the finger strips 11 and provided at its edges with opositely directed and generally coplanar flanges 17' which are arranged for their flat seating upon the outermost finger strips 11" while the clamp is functioning. A rear portion 18 of the member 15 provides opositely-directed ears 18' provided with mutually aligned slots 19 for receiving therethrough the sides of a U-bolt 21 which is utilized for clamping the handle 13 to the superposed inner ends of the tine-providing strips which are disposed through the bight of the bolt, with the opposed cylindrical handle portion longitudinally socketed against the member 15 along the common longitudinal line of its portions 16 and 17 and 18 in the longitudinal channel thereof, while the flanges 17' engage the strips 11".

For stiffening the connection provided by the U-bolt 21, a secondary clamp plate member 22 is engaged across the rear portion 18 of the member 15 and is provided with holes comprising aligned slots for simultaneously receiving the U-bolt ends while the adjacent side portions of the bolt tangentially engage the handle 13 between them, and the releasable clamping of the assembly thereat is effected by applying wing nuts 23 to the extending bolt ends.

Means are provided for positively preventing a relative shifting of the finger strips 11 longitudinally with respects to each other and to the handle 13 and the clamp assembly. As particularly shown, a J-bolt 24 has its shank extended through aligned holes provided transversely through the superposed finger strip portions at their line of divergence and diametrically through the handle and transversely through holes provided in the clamp plates 15 and 22, with the hook of the bolt 24 engaging around the bight of the U-bolt 21 to prevent a turning of the bolt during the mounting or dismounting of a clamping wing nut 25 on the extending bolt end.

A straight and generally rigid stiffening means 27 is provided across the finger strips 11 at or adjacent the strip points at which the strips are divided to provide the tines 14, and said means essentially comprises rigid upper and lower bars 28 and 29 of suitable material, such as split bamboo, mutually opposed at opposite sides of the strips and secured together by a suitable flexible strand or cord 30 wound spirally around the bars and through the strip assembly. The strips 11 are substantially coplanar at the bars 28 and 29, said bars are perpendicular to the handle axis, and the bar assembly flattens the head thereat while stiffening it against undue torsion effects. Preferably, and as shown, the handle 13 is generally cylindrical except for a flat tapering thereof at its under side beyond the sleeve portion 16 of the clamp structure, and has the forward end thereof disposed in overlying relation to the midpoint of the relatively rigid reinforcing structure 27 to which it is secured by a bolt 31 extending through registering holes provided through the central finger strip 11' and the bars 28 and 29, and having a wing nut 32 engaging it at the back of the head for detachably securing the stiffening assembly to the forward terminal portion of the handle 13.

A flexible reinforcing member 37 is provided across the tines 14 at an intermediate and suitable point beyond the stiffening means 27, and this member preferably comprises a flexible strip or bar of resilient material, as of a moderately hard rubber or a manufactured plastic or the like having the qualities desired. The member 37 is preferably, though not necessarily, of rectangular cross-section and is provided at locations uniformly spaced longitudinally thereof with apertures 38 of rectangular cross-section extending laterally therethrough for individually receiving the resilient tines 14 through them. The member 37 is also provided with transversely extending cuts 39 extending from each aperture 38 to the same side face of the member, and each of these cuts opens up when the member is sharply bent at the location of the cut, whereby to provide a passage through which a tine 11 may be inserted or removed with respect to the corresponding aperture 38. The cuts 39 are preferably disposed at an angle to the longitudinal line of the member 37 so that, when the member 37 is straightened, the cuts are firmly closed and the angularity of the cuts further prevents an accidental escape of the inserted tines from the apertures of the member.

As shown in Figures 7 and 8, the flexible reinforcement for the tines may be provided by cooperative tie strands 44 and 45 instead of the flexible member 37, with each said strand comprising a core of flexible wire enclosed in a sheath or covering of flexible material, such as natural or synthetic rubber or a synthetic resin plastic. The strands 44 extend across the tines at corresponding sides thereof and the strand 45 is so entwined with the strand 44 and the tines as to hold the tines evenly spaced in their laterally aligned relation. In the specific arrangement shown in Figure 7, the strand 45 is alternatively looped around successive tines and around the tine portions which engage the strand 44. This tine-tying device might also be advantageously used to tie the tines together at cross-lines between the rigid and flexible assemblies 27 and 37 respectively, as indicated at 46 in Figures 1 to 3 inclusive.

By reason of the disclosed completely knock-down arrangement with its mutually detachable elements, it will be understood that the present implement may be quickly and easily assembled following its transportation in disassembled form, that new tine strips may be readily substituted in the assembled rake for strips having bent or broken tines, and that the disclosed assembly accomplishes, the stated and other objects of the invention. It will also be understood that certain of the elements may be formed of various materials for their purposes; thus, for instance, the resiliently flexible tines 14 may be of bamboo or steel or a plastic, the handle stick 13 may be of wood or metal, the stiffening bars 28 and 29 may be of wood or steel, and the clamp plate members 15 and 22 may be of metallic or plastic material. Also, while the illustrated rake assembly may advantageously utilize both of the clamp plates 15 and 22, it will be noted that either plate member may be used alone to provide a satisfactory structure by utilizing therethrough the U-bolt 21 and the J-pin 24, or their operative equivalents, for securing the finger strips 11 to the handle 13.

From the foregoing description, taken in connection with the accompanying drawings, the advantages of the present raking implement may be readily understood by those skilled in the art to which the invention appertains. While I have described forms of my invention which I now consider to comprise a preferred embodiment thereof, I desire to have it understood that the showings are primarily illustrative, and that such changes and developments may be made, when desired, as fall within the scope of the following claims,

What I claim is:

1. In a sweeping or raking element, a handle stick, a fan-shaped head structure comprising a plurality of finger strips of resilient material having corresponding end portions at the apical end of the head disposed in superposed crossing relationship at a common line transverse thereto, a clamp plate member providing a cylindrically concave handle-receiving channel along its length, mutually coplanar wing portions of the plate extending oppositely from the side edges of the channel at a rear first part of the plate, a U-bolt receiving the superposed finger strip portions at its bight and having its sides spanning the handle thereat and having threaded ends extending through transverse openings in said wing portions of the plate and mounting nuts directly operative to effect and maintain a mutually clamped relation of the engaged strip portions and handle portion between the bight of the bolt and the clamp plate, mutually coplanar second wing portions provided by and extending oppositely from an intermediate second part of the plate channel forwardly of the first wings and arranged to engage flat against the outermost strips of the finger assembly when the plate and U-bolt cooperatively secure the finger assembly and handle stick together, and plate portions extending from a forward third part of the plate channel cooperative with the channel part to provide a split ferrule closely receiving the engaged handle portion thereat.

2. In a sweeping or raking implement comprising a fan-shaped head and an elongated handle stick detachably secured at its forward end portion to the apical end of said head in the longitudinal line of the head, the arrangement wherein said head structure includes a plurality of finger strips of resilient material having their inner end portions at the apical part of said head disposed in superposed crossing relationship at a common fixed transverse line in the longitudinal line of the head and diverging uniformly from each other at said head line, a rigid stiffening means extending transversely across intermediately thereof and at a location spaced forwardly from the said secured rearward portion of the head and detachably secured to said finer strips and said handle, and a flexible tieing structure extending transversely across said finger strips at a location spaced forwardly from said rigid stiffening means and comprising a bar of resiliently elastic material having apertures extending transversely therethrough and respectively receiving said finger strips in laterally spaced relation and having cuts extending from each aperture to the same exterior face of the bar for their opening to provide passageways for independently inserting or removing said finger strips with respect to the bar.

3. In a hand implement for sweeping or raking, a fan-shaped head structure including a plurality of thin finger strips of resilient material having their end portions at the apical end of said structure disposed and held in superposed relationship and being longitudinally divided from intermediate points thereof to provide tines extending to the working end of the head, a rigid stiffening structure extending across said fingers at a finger location at which the fingers are coplanar and are divided to provide the tines, a handle stick having its forward end portion secured to the apical end of the head and to said rigid stiffening structure in the longitudinal axis of the head, and a flexible tieing structure extending across said tines at a location spaced forwardly from said rigid stiffening structure and comprising a bar of resiliently elastic material having similarly-directed apertures extending similarly and transversely therethrough at locations spaced apart therealong and individually receiving said tines of the finger strips for holding said tines in fixed spaced-apart relationship, said bar having slits extending from the apertures to a common side of said bar to provide passages for inserting said tines of a finger strip in the appropriate apertures when the bar is arcuately flexed to open the slits.

4. In a sweeping or raking implement, a handle stick, a fan-shaped head structure comprising a plurality of finger strips of resilient material having corresponding end portions at the apical end of the head disposed in superposed crossing relation at a common line transverse thereto, a clamp plate member providing a cylindrically concave handle-receiving channel portion complementarily receiving a forward handle stick portion and having rearward and forward pairs of corresponding and mutually coplanar wing portions extending from opposite edges of the channel, a U-bolt receiving the superposed finger strip portions in its bight and having its sides spanning the handle at said crossing line of the finger strips and having threaded ends extending through openings provided transversely through the rearward pair of said wind portions of the clamp plate, and nuts removably mounted on the extending ends of the U-bolt sides and operative to directly effect a mutually clamped relation of the strip ends and handle between the bolt bight and the clamp plate, the wings of the forward pair being arranged to engage flat against the laterally outermost strips of the finger assembly while the clamp plate and U-bolt cooperatively secure the fingers and handle together.

References Cited in the file of this patent
UNITED STATES PATENTS

| | | |
|---|---|---|
| 1,499,086 | Tsuchiya | June 24, 1924 |
| 1,752,447 | Maus | Apr. 1, 1930 |
| 1,880,580 | Tokunaga | Oct. 4, 1932 |
| 2,076,764 | Cowdery | Apr. 13, 1937 |
| 2,210,784 | Tokunaga | Aug. 6, 1940 |
| 2,365,393 | Connolly | Dec. 19, 1944 |
| 2,666,288 | Kimura | Jan. 19, 1954 |